United States Patent
Fujinuma (10) Patent No.: US 6,923,083 B2
(45) Date of Patent: Aug. 2, 2005

(54) SHIFT MANIPULATING DEVICE FOR AN AUTOMATIC TRANSMISSION

(75) Inventor: Takao Fujinuma, Tokyo (JP)

(73) Assignee: Niles Parts Co., Ltd. (JP)

( * ) Notice: Subject to any disclaimer, the term of this patent is extended or adjusted under 35 U.S.C. 154(b) by 182 days.

(21) Appl. No.: 09/986,427

(22) Filed: Nov. 8, 2001

(65) Prior Publication Data

US 2002/0056334 A1 May 16, 2002

(30) Foreign Application Priority Data

Nov. 16, 2000 (JP) .................................... P2000-349110

(51) Int. Cl.$^7$ ............................................. B60K 20/00
(52) U.S. Cl. ............................... 74/473.33; 74/473.27; 74/473.23
(58) Field of Search .................... 74/473.33, 473.27, 74/473.28, 473.23, 473.24, 473.25, 473.26, 473.12; 192/219.6

(56) References Cited

U.S. PATENT DOCUMENTS

| | | | |
|---|---|---|---|
| 4,218,938 A | * 8/1980 | Hattori | 475/86 |
| 4,283,722 A | * 8/1981 | Kito et al. | 340/685 |
| 4,519,266 A | * 5/1985 | Reinecke | 74/471 XY |
| 4,646,582 A | * 3/1987 | Kijima | 74/473.33 |
| 5,695,029 A | * 12/1997 | Yokoyama et al. | 192/219.6 |
| 5,917,701 A | * 6/1999 | Solberg | 361/704 |
| 6,120,412 A | * 9/2000 | Fujinuma | 477/99 |
| 6,192,770 B1 | * 2/2001 | Miyoshi et al. | 74/473.18 |

FOREIGN PATENT DOCUMENTS

| | | | |
|---|---|---|---|
| JP | 11-192852 | | 7/1999 |
| JP | 11227488 A | * | 8/1999 |

* cited by examiner

Primary Examiner—Robert A. Siconolfi
Assistant Examiner—Melody M. Burch
(74) Attorney, Agent, or Firm—Rader, Fishman & Grauer PLLC (57) ABSTRACT

A shift manipulating device for an automatic transmission includes a shift lever of an automatic transmission device and a path formed on an upper cover of a control switch device. The path includes manipulating positions arranged in at least P range, R range, N range and D range in this order, and on three lines, that is, second line, third line and fourth line in right and left directions. The P range is arranged in a first path on the second line and at an end of the path, the R range is arranged in a second path on the fourth line of the first path, the N range is in a third path on the second line of the second path, and the D range is in a fourth path on the second line.

Thus the number of parts and man-hour for assembling are reduced.

6 Claims, 9 Drawing Sheets

| | | PG | P | R | N | D | DT | + | − |
|---|---|---|---|---|---|---|---|---|---|
| select position | 19a | | | | | ○ | ○ | ○ | ○ |
| switch S1 | 19b | ○ | ○ | ○ | | | | | |
| (hall element) | 19c | | | ○ | ○ | ○ | ○ | ○ | ○ |
| | 12a | | | | | | ○ | ○ | ○ |
| | 12b | | | | | | | ○ | |
| | 12c | | | | | | | | ○ |
| parking gate | 14 | ○ | | | | | | | |
| switch S2 | | | ○ | | | | | | |

| | | P II | P III | R | N | D II | D I | + | − |
|---|---|---|---|---|---|---|---|---|---|
| select position switch S3 (hall element) | S11 | ○ | ○ | ○ | ○ | ○ | ○ | ○ | ○ |
| | S12 | | | | | ○ | ○ | ○ | ○ |
| | S13 | ○ | ○ | ○ | | | | | |
| | S14 | | | ○ | ○ | ○ | ○ | ○ | ○ |
| | S15 | | | | | | ○ | ○ | ○ |
| | S16 | | | | | | | ○ | |
| | S17 | | | | | | | | ○ |
| parking gate switch S4 | 14a | ○ | | | | | | | |
| | 14b | ○ | | | | | | | |

SHIFT MANIPULATING DEVICE FOR AN AUTOMATIC TRANSMISSION

BACKGROUND OF THE INVENTION

1. Field of the Invention

The invention relates to a shift manipulating device for an automatic transmission, which is usable for a shift lever for shift to a desired operating position among respective operating positions such as running, stoppage, parking or the like in an automobile loaded with an automatic transmission.

2. Description of the Related Art

For example, Japanese Patent Laid-Open No. 192852/1999 discloses an invention of a shift manipulating device of this type for an automatic transmission in the prior art. The shift manipulating device is actuated by the swinging manipulation of a shift lever, and is provided with an A/T switch, which serves to transmit to a transmission side an electric signal corresponding to a desired operating position, and an electrically driven type actuator for drivingly separating an engaging pin, which inhibits movements of a shift lever, from an engaging groove on a detent plate.

The lever in the shift manipulating device transmits thereto movements of an actuator via a linkage. Also, the lever mounts a holder on its base end and arranges the holder in engagement with a movable board. First perturbing members composed of a plurality of springs and a plurality of steel balls are arranged between the movable board and the casing to hold the lever in respective positions. Second perturbing members composed of a plurality of springs and a plurality of steel balls are arranged between the movable board and the holder to hold the lever in the auto-mode and the manual mode.

Also, the shift lever device is provided with two switches, which consists of an A/T switch and a MAN mode switchover switch. The A/T switch is provided with respective switches, which are set to act in respective positions upon movement of the movable board.

However, since the actuator of the above-mentioned prior shift manipulating device drives an engaging pin, which inhibits movements of the lever, via a linkage and a lock plate, it is necessary to enlarge a distance, over which the lever and the linkage move, and so such distance of movement is enlarged by making the lever swing about a lower end of the casing. Therefore, there is caused a problem that the shift lever device is made large-sized as a whole. Since the shift lever device is arranged in a manner to prevent movements of the actuator via the substantially L-shaped linkage and the lock plate, there is caused a problem that the linkage and the lock plate occupy an interior of the device to make the shift lever device large-sized as a whole.

SUMMARY OF THE INVENTION

The invention has been thought of to solve the above-mentioned problems, and aims to provide a shift manipulating device for an automatic transmission, which is small-sized and in which the :number of parts and manhour for assembling are reduced.

The invention has been devised to solve the above-mentioned problem of the prior art, and provides, a shift manipulating device for an automatic transmission, comprising a path which is formed on an upper cover of a control switch device and permits a shift lever of the automatic transmission to be inserted therethrough to thereby restrict a direction of manipulation of the shift lever, wherein the path comprises operating positions composed of at least a P range, R range, N range, and a D range, the P range, R range, N range and the D range being arranged in this order from a front side of a vehicle, the shift lever being adapted to be disposed on three lines including a second line, third line and a fourth line in a right and left direction; the P range is formed on an end of the path and arranged in a first path on the second line; the R range is arranged in a third path on the third line from the first path through a second path; the N range is arranged in a fifth path on the second line from the third path through a fourth path; and the D range is contiguous and adjacent to the fifth path and arranged in a sixth path on the second line.

According to the invention, the shift lever has a knob at an upper end thereof and a holder at a lower end thereof provided with a perturbing body, which is biased by a perturbation spring, and the holer supports a second shaft in a rotatable manner and is provided with a first shaft, which is perpendicular to the second shaft and is born by a casing.

According to the invention, the perturbing body is in pressure contact with a perturbation groove for returning the shift lever to the second line of the path, and a perturbation groove for supporting the shift lever in the P range, R range, N range and the D range.

According to the invention, the holder mounts a lock pin laterally thereof for preventing the shift lever on the second line from moving toward the third line.

according to the invention, the lock pin is biased by a spring and arranged in a lock-pin insertion hole in a manner to be capable of incoming and outgoing, the lock-pin insertion hole being formed in an inner wall of the casing, and a stopper movably arranged on a back portion of the lock pin prevents the lock pin from entering into the lock-pin insertion hole.

According to the invention, the stopper is swung by an actuator via a linkage, and the linkage connects at one end thereof to the actuator and has at the other end thereof the stopper, which is arranged on the back portion of the lock pin to be capable of incoming and outgoing.

According to the invention, the first shaft has a rotor adapted for rotation together with the first shaft and provided with a magnet, and a first substrate is provided near the rotor to mount thereon magnetism sensing elements, which are responsive to magnetism of the magnet.

According to the invention, the holder is provided at a side thereof with a magnet, and a first substrate is provided near the holder to mount thereon magnetism sensing elements, which are responsive to magnetism of the magnet.

According to the invention, the holder is provided on a side thereof with a pushing portion for opening and closing a parking gate switch, and a first substrate is provided near the holder to mount thereon the parking gate switch.

The invention also a provides a shift manipulating device comprising a path which is formed on an upper cover of a control switch device and permits a shift lever of an automatic transmission to be inserted therethrough to thereby restrict a direction of manipulation of the shift lever, wherein the shift lever has a lower end thereof disposed within a casing, which is mounted on the upper cover, and an electrode board is provided in the casing to mount thereon electric parts of an actuator control circuit device for actuating an actuator for preventing movements of the shift lever.

According to the invention, the electric parts generating heat among the electric parts of the actuator control circuit device are mounted on a heat sink, which in turn is mounted on the electrode board.

According to the invention, that the casing mounts in a lower area therein a bottom plate portion formed with a perturbation groove, with which a perturbation body provided on a holder at a lower end of the shift lever comes into pressure contact, and mounts on an inner wall thereof the electrode board, and a second substrate is arranged below the bottom plate portion to connect thereto terminals mounted on the electrode board.

The invention also provides a shift manipulating device for an automatic transmission, comprising a path which is formed on an upper cover of a control switch device and permits a shift lever of the automatic transmission to be inserted therethrough to thereby restrict a direction of manipulation of the shift lever wherein the shift lever has a lower end thereof disposed within a casing which is mounted on the upper cover, and a buzzer is arranged in the casing.

DETAILED DESCRIPTION OF THE INVENTION

Embodiments of the invention will be described below with reference to FIGS. 1 to 11. In FIGS. 1, 2, 3 and 4, the reference numeral 1 denotes a shift lever loaded on an automobile with an automatic transmission, the shift lever serving for shift manipulation to a desired running position from respective positions such as running, stoppage, parking or the like. The shift lever 1 is made from, for example, a metallic rod-shaped pipe, and fix a knob 2 at its upper end and a holder 3 at its lower end, the lever being swingably supported on a first shaft 5 and a second shaft 7 disposed in a casing 4.

The upper end of the shift lever 1 is inserted through a path 6a formed through an upper cover 6 to swingably protrude outside the casing 4 to be guided by the path 6a for swinging operation. The lower end of the shift lever 1 is inserted into an upper portion 3b of the holder 3 to be fixed thereto by means of screws 8 to swing together with the holer 3.

Figure 5:
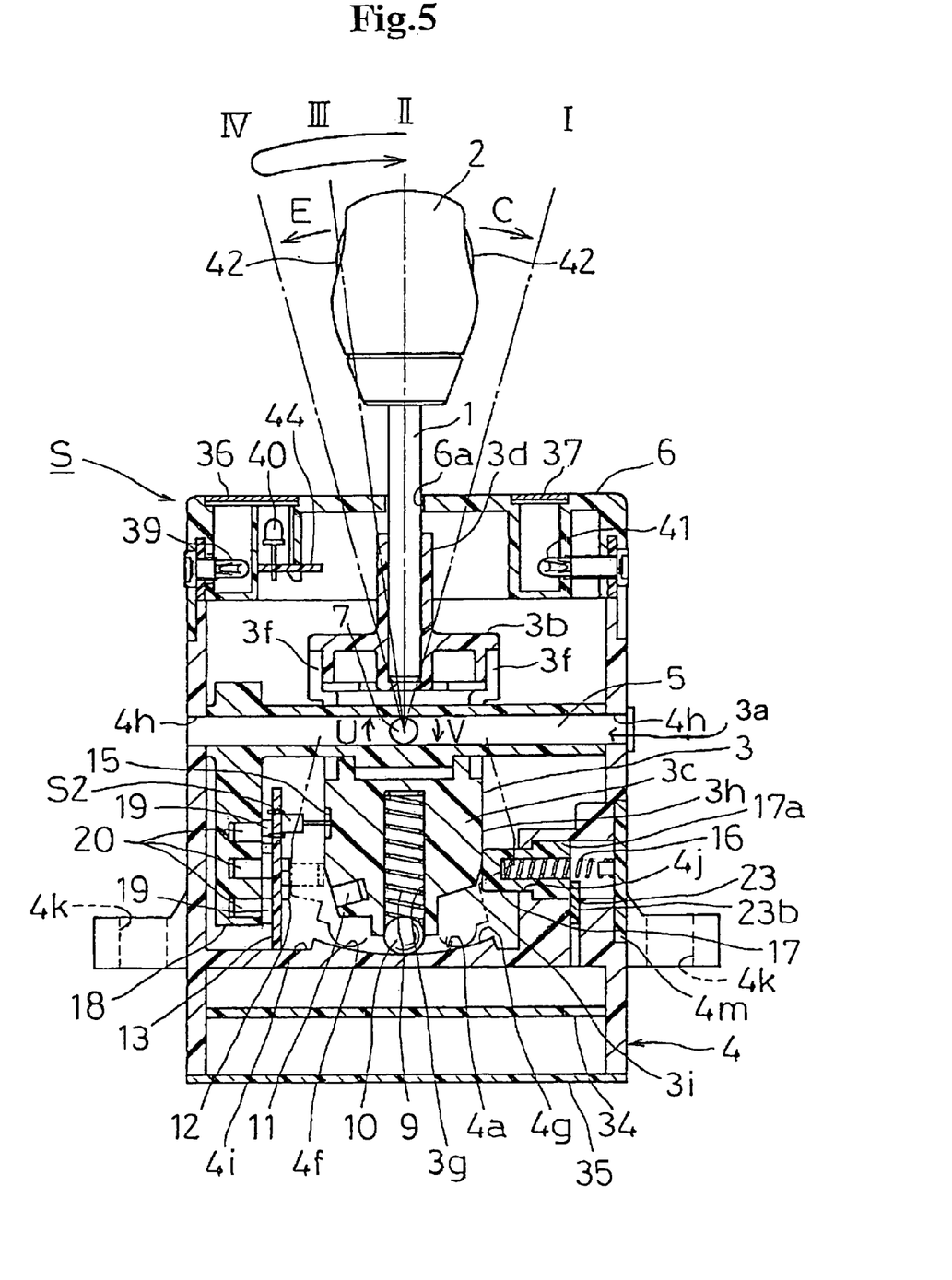
FIG. 5 is a view showing the embodiment of the invention, and an enlarged, longitudinal cross sectional view showing a state, in which the shift lever is on a second line.

Also, the shift lever 1 pivotally supports the holer 3 at its second shaft 7 as shown in FIG. 5 and the first shaft 5 extending centrally of and perpendicular to the second shaft 7 is pivotally supported by axial holes 4h of the casing 4, so that the shift lever constitutes a universal joint to swing together with the holder 3 in front and rear directions indicated by arrows A, B and in right and left directions indicated by arrows C and E.

Figure 3:
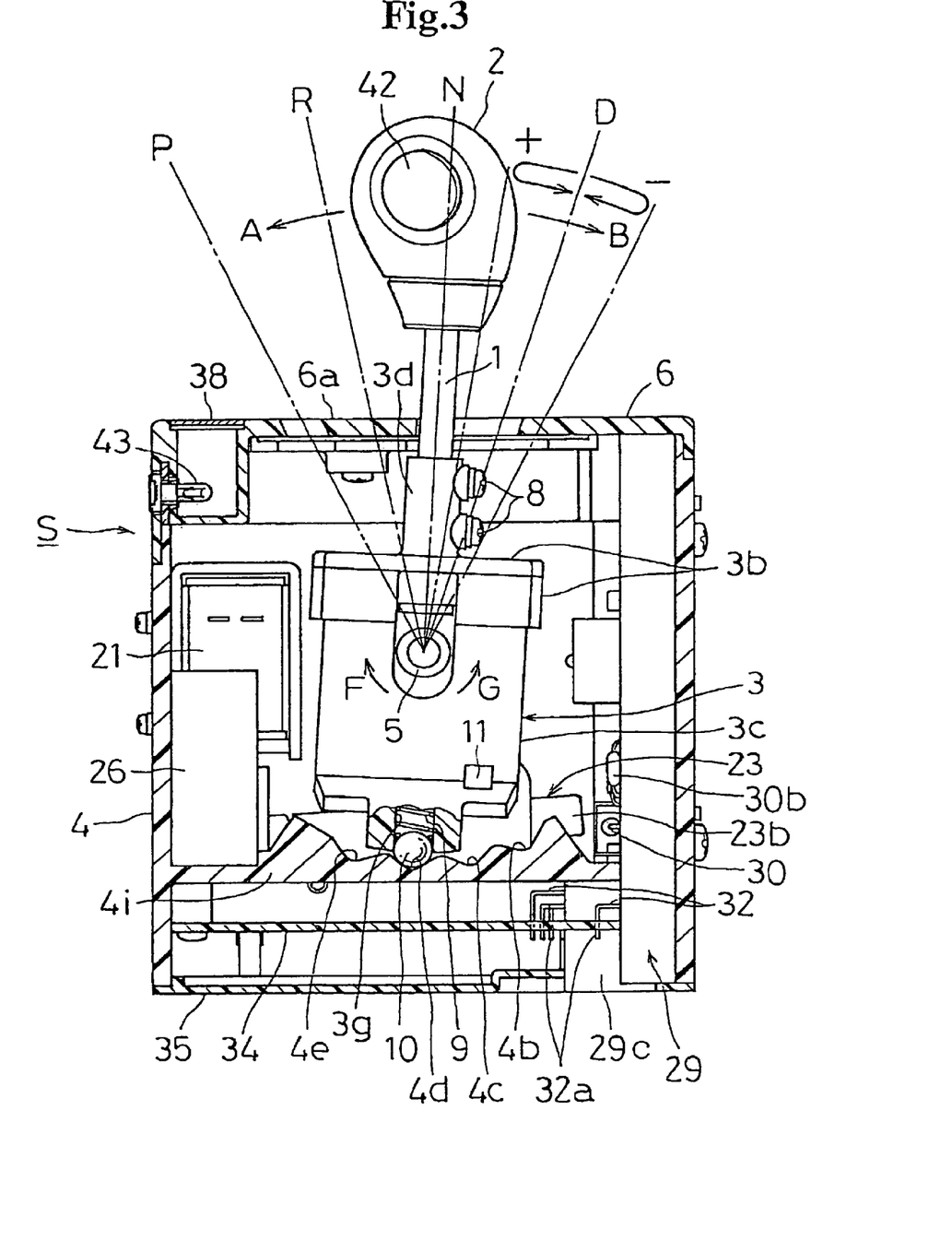
FIG. 3 is a view showing the embodiment of the invention, and an enlarged, longitudinal cross sectional view showing a state, in which a shift lever is in a N range.

The shift lever 1 is covered at its upper end with a soft resin or leather as shown in FIGS. 3 and 5 and secures thereto the knob 2 with a pseudo select button 42. The shift lever 1 is arranged with the upper end protruding from the casing 4, respective members described later are provided within the casing 4, and the casing 4 is secured to a car body by inserting screws through screw insertion holes 4k formed on side wall portions thereof and threading the same thereto.

The holder 3 comprises the upper portion 3b and a lower portion 3c and may be provided integral with the shift lever 1. The upper portion 3b is composed of a cover-shaped body, which matches an upper side of the lower portion 3c, and is formed with a cylindrical-shaped portion 3d, through which the shift lever 1 is inserted.

The lower portion 3c is formed with notched grooves 3e on both sides of an axial hole 3a, which pivotally supports the second shaft 7, to make a portion around the axial hole 3a an elastically tongue-shaped portion with elasticity. The lower portion 3c permits the second shaft 7 to rotatably extend through the axial hole 3a, and is formed with a slot 3f, which permits the first shaft 5 to extend in a direction 90° away from the axial hole 3a and swing in a vertical direction indicated by arrows U and V. Thereby, assuming that the holder 3 is made stationary, the first shaft 5 swings together with the shift lever 1 when the second shaft 7 turns in the direction indicated by arrows U and V.

The lower portion 3c is formed at its lower end with a blind hole 3g, into which a perturbation spring 9 and a perturbing body 10 are inserted. The perturbing body 10 biased by the perturbation spring 9 is brought into pressure contact with a perturbation groove 4a, which is formed on an inner bottom of the casing 4, to hold the shift lever 1 in respective positions (P, R, N, D) in the path 6a and to permit the shift lever 1 to be returned automatically. The perturbation groove 4a comprises, as shown in FIG. 3, a first perturbation groove 4b for holding the shift lever 1 in a P range, a second perturbation groove 4c for holding the shift lever 1 in a R range, a third perturbation groove 4d for holding the shift lever 1 in a N range, and a fourth perturbation groove 4e for holding the shift lever 1 in a D range, these grooves being formed in front and rear directions.

Also, the perturbation groove 4a comprises, as shown in FIG. 5, a first inclined surface 4f for causing the shift lever 1 disposed in a first line 1 in the path 6a to automatically return to a second line 11, and a second inclined surface 4g for causing the shift lever 1 disposed in a third line 111 and a fourth line IV to automatically return to the second line II.

Provided on a side of the lower portion 3c of the holder 3 toward the fourth line IV are a magnet 11 for actuating a magnetism sensing element 12 when the shift lever 1 is in a shift-up position + and a shift-down position −, and a pushing portion 15 for opening and closing a parking gate switch S2. The magnet 11 comprises a plate-shaped permanent magnet embedded in the lower portion 3c. The magnet 11 comes close to the magnetism sensing element 12 to actuate the same when the shift lever 1 is manipulated onto the first line I as shown by an imaginary line in FIG. 5.

The pushing portion 15 is a member for pressing the parking gate switch S2 consisting of, for example, a push-button switch, and formed from a metallic pin planted on the lower portion 3c. In addition, the pushing portion 15 is one sufficient to be capable of pressing the parking gate switch S2, and may be formed integral with the holder 3. Thus the pushing portion is not specifically limitted in configuration and material.

Figure 1:
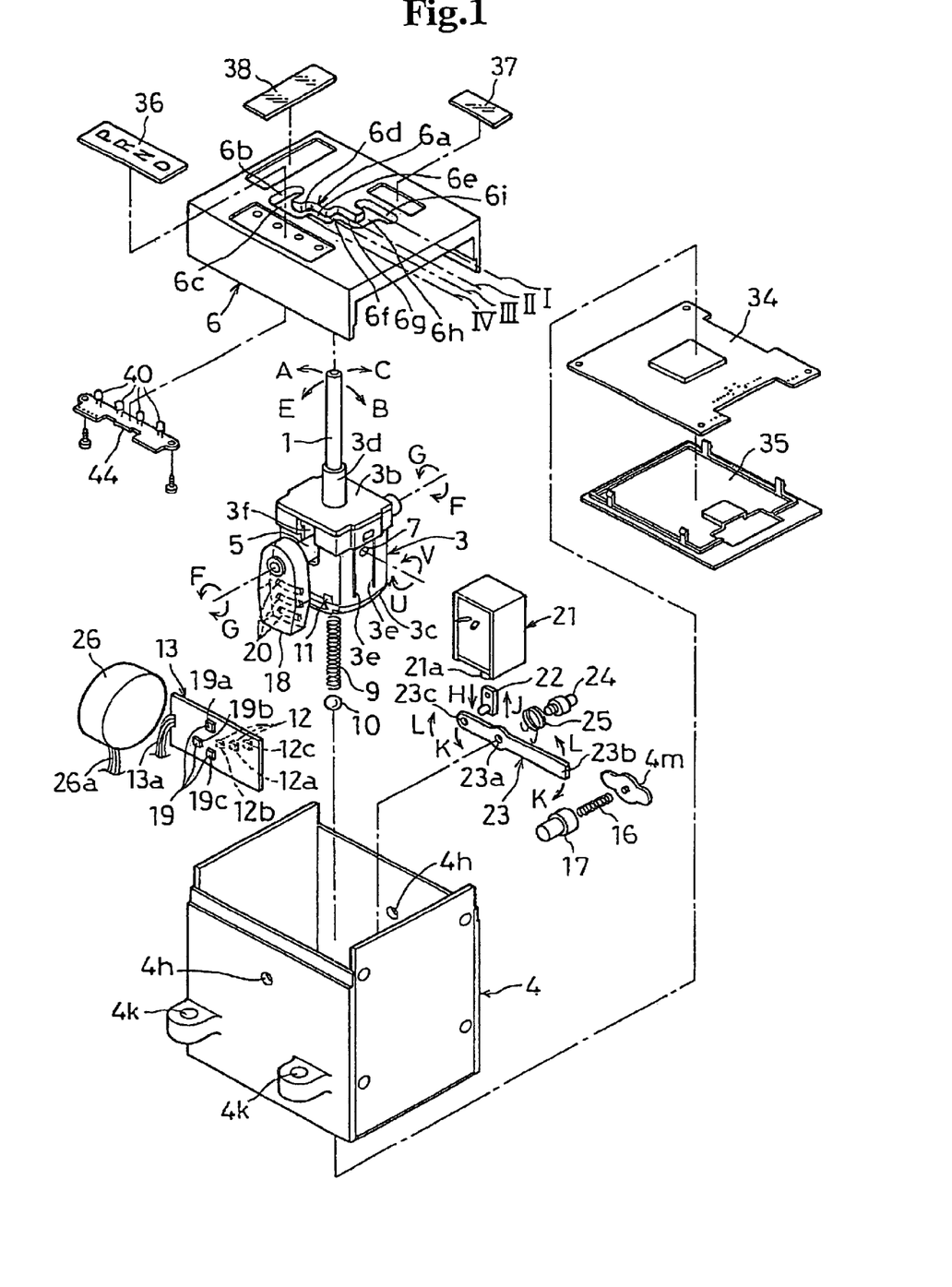
FIG. 1 is a view showing an embodiment of the invention, and an exploded, perspective view showing essential parts.

The first shaft 5 is provided, as shown in FIGS. 1 and 5, with a rotor 18, which rotates together with the first shaft 5, and has its both ends rotatably inserted into the axial holes 4h provided in the casing 4. Embedded in the rotor 18 are three magnets 20 that are disposed to be opposed to three magnetism sensing elements 19 arranged on a first substrate 13 provided between the rotor 18 and the holder 3 and composed of hall elements or the like.

The magnets 20 are mounted on the rotor 18 to register with the P range, R range, N range and the D range on the shift lever 1. The respective magnets 20 are arcuate in shape about the first shaft 5. When the shift lever 1 is manipulated to be swung in the front and rear directions indicated by arrows A, B, the magnets 20 turn together with the first shaft 5 and the rotor 18 in directions indicated by arrows F and G to open and close the respective magnetism sensing elements 19 as shown in FIGS. 1 and 3.

The first substrate 13 is present between the rotor 18 and the holder 3 as shown in FIG. 5 and is provided upright on a bottom plate portion 4i of the casing 4. The first substrate 13 mounts the magnetism sensing element 12 and the parking gate switch S2 on a side thereof toward the holder 3, and the magnetism sensing elements 19 on a side toward the rotor 18. The first substrate 13 secures thereto a harness 13a being connected to a second substrate 34 as shown in FIG. 1.

Figure 4:
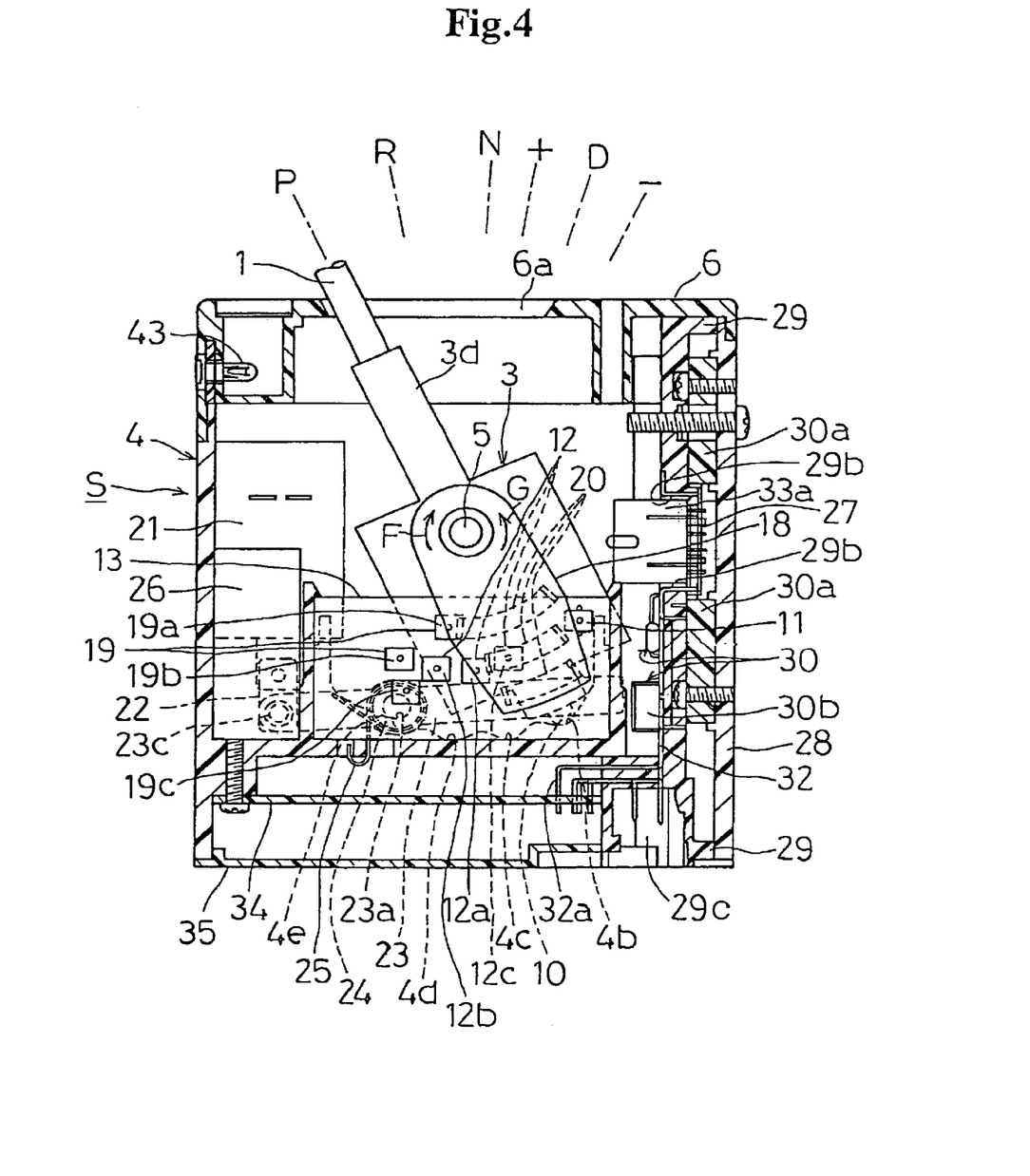
FIG. 4 is a view showing the embodiment of the invention, and an enlarged, longitudinal cross sectional view showing a state, in which the shift lever is in a P range.

The magnetism sensing element 12 is composed of a hail element or the like that is made ON by magnetism when the shift lever 1 is inclined onto the first line I as shown in FIG. 5 and so the magnet 11 provided on the holder 3 comes close to the element. The magnetism sensing element 12 comprises three elements, that is, a magnetism sensing element 12a for detecting that the shift lever 1 is in the neutral position in the manual mode, a magnetism sensing element 12b for detecting that the shift lever is in the shift-up position +, and a magnetism sensing element 12c for detecting that the shift lever is in the shift-down position –. The respective magnetism sensing elements 12a, 12b, 12c are arranged in an arc corresponding to a movement locus of the magnet 11 so as to be capable of detecting approach of the magnet 11 swinging together with the shift lever 1 when the shift lever 1 is swingingly manipulated to the shift-up position + and the shift-down position – from the neutral position in the manual mode as shown in FIGS. 1 and 4.

The magnetism sensing elements 19 comprises three magnetism sensing elements 19a, 19b, 19c for detecting that the shift lever 1 is in the R range, N range and D range in the auto-mode. The magnetism sensing elements 19a, 19b, 19c are hall elements or the like adapted to approach and respond magnetically when the respective magnets 20 provided on the rotor 18 to swing together with the shift lever 1 in the front and rear directions indicated by arrows A, B are in the R range, N range and D range in the auto-mode. In addition, the parking gate switch S2 detects that the shift lever 1 is in the P range.

Also, a lock pin 17 biased by a spring 16 as shown in FIG. 5 is arranged on a side of the lower portion 3c of the holder 3 toward the first line I. The lock pin 17 is a member for abutting against a side abutting surface 3h of the lower portion 3c to restrict swinging of the holder 3 and the shift lever 1. The lock pin 17 is inserted into a lock-pin insertion hole 4j from outside of the casing 4 to be capable of incoming and outgoing as shown in FIGS. 1 and 5, and is closed by a cover member 4m with the spring 16 therebetween.

The lock pin 17 is prevented from entering into the lock-pin insertion hole 4j when a stopper 23b on a lock bar 23 described later is moved to an area behind the lock pin 17 by an actuator 21. When the stopper 23b is present behind the lock pin and the shift lever 1 is in the first line I and in the second line II on the path 6a, the lock pin 17 abuts against the side abutting surface 3h of the lower portion 3c to prevent the shift lever 1 from moving to the third line III and the fourth line IV on the path 6a.

Figure 2:
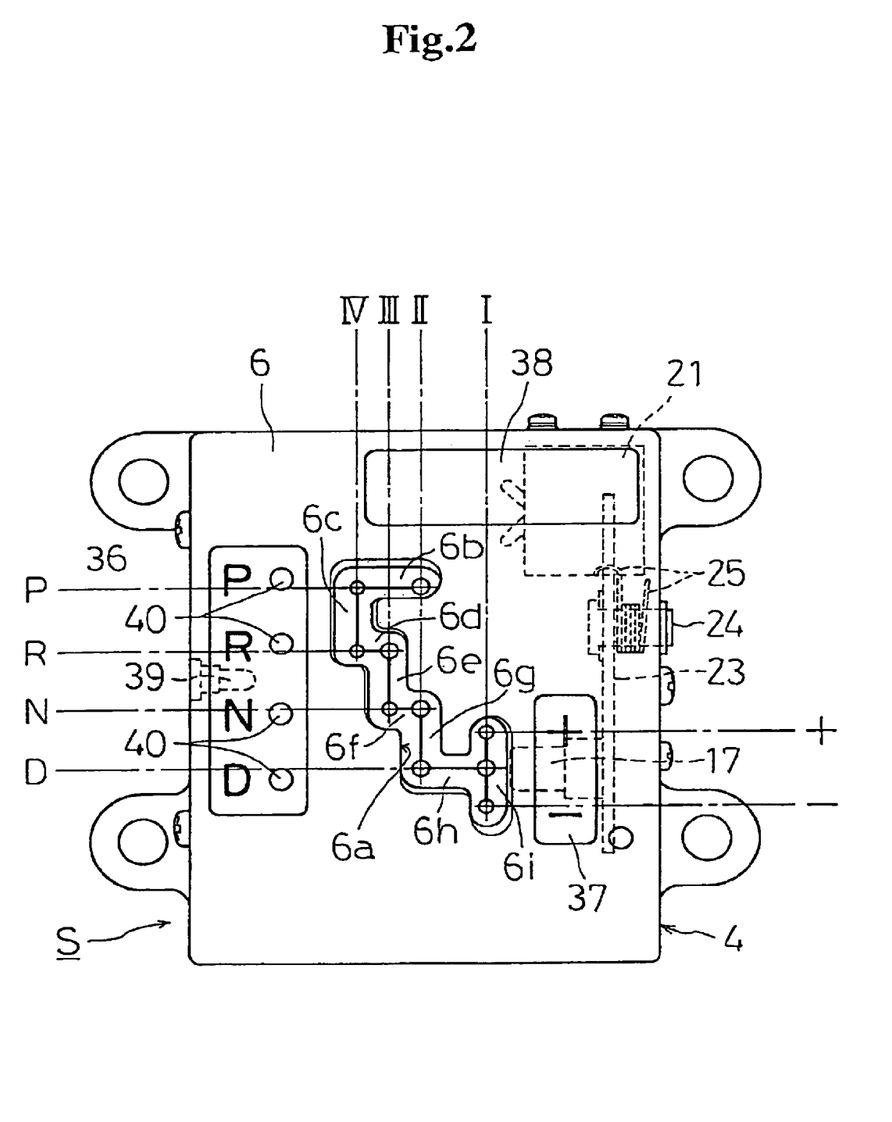
FIG. 2 is a view showing the embodiment of the invention, and an enlarged, plan view showing a casing.

That is, when movement is prevented by the stopper 23b, the lock pin 17 abuts against the side abutting surface 3h, merging with an angled lower surface 3i, of the lower portion 3c of the holder 3 to prevent the shift lever 1 present in the second line II on the first path 6b as shown in FIG. 2 from being manipulated to other ranges through the second path 6c, and the shift lever 1 present in the N range of the second line II from being manipulated to the R range of the third line III.

Also, arranged on a side wall toward the first line I within the casing 4 are the actuator 21, a connecting member 22 interlocking with a plunger of the actuator 21, the lock bar 23 connected to the connecting member 22 to swing about a spindle 24, and the spindle 24 installed on an inner wall of the casing 4, and a return spring 25 fitted onto the spindle 24 to return the lock bar 23, having been swung by the actuator 21, to an original position as shown in FIGS. 1 and 2.

The actuator 21 is an electrically driven one constituted by a solenoid actuated by an electromagnetic force or a motor. The actuator 21 is actuated by a stop lamp switch (not shown) that is made ON by depressing of a brake pedal. Upon actuation, the actuator 21 swings the lock bar 23 to cause the stopper 23b arranged on the other end of the lock bar 23 to maintain the lock pin 17 in a projecting state as shown in FIG. 5, thereby restricting the range of swinging of the holder 3.

When the brake pedal is not depressed, the actuator 21 is made OFF to cause a plunger 21a to projectingly move as shown in FIG. 1 to move the connecting member 22 in a direction indicated by an arrow H. The connecting member 22 connects an upper end thereof to the plunger 21a as shown in FIG. 1 and fits a lower end thereof into a connection hole 23c formed on one end of the lock bar 23.

The lock bar 23 is made from a long plate-shaped piece of metal, and is pivotally supported at a substantially central portion thereof on the spindle 24, which is born on an inner wall of the casing 4, and is biased by the return spring 25 in a direction indicated by an arrow L. When the actuator 21 is made OFF, the plunger 21a is pushed by the return spring 25 to be returned in a direction indicated by an arrow J.

When the connecting member 22 is moved in a direction indicated by the arrow H, the lock bar 23 is turned by the connecting member 22 about the spindle 24 in a direction indicated by the arrow K, so that the stopper 23b at one end thereof moves behind an inner end surface 17a of the lock pin 17 as shown in FIG. 5. Thereby, the lock bar 23 prevents the lock pin 17 from entering into the lock-pin insertion hole 4j and the shift lever 1, which swings together with the holder 3, from being manipulated toward the third line III and the fourth line IV in the direction indicated by the arrow E.

When the brake pedal is not depressed, a tip end of the lock pin 17 abuts against the side abutting surface 3h of the lower portion 3c of the holder 3. Therefore, when it is tried to manipulate the shift lever 1 onto the third line III and the fourth line IV from the first line I and the second line II, the lock pin 17 abuts against the side abutting surface 3h of the lower portion 3c of the holder 3 to prevent the shift lever 1 from swinging, so that the shift lever 1 cannot be manipulated to the third line III and the fourth line IV.

That is, even when the shift lever 1 is manipulated so that the shift lever 1 present in the P range in the second line II is shifted to other ranges such as the R range, N range or the D range, the lock pin 17 makes the shift lever 1 inoperable and so can prevent malfunction. Also, even when the shift lever 1 is manipulated so that the shift lever 1 present in the N range in the second line II is shifted to the R range and the P range, the lock pin 17 makes the shift lever 1 inoperable and so can prevent malfunction.

When the shift lever 1 present in the first line I and the second line II is to be manipulated onto the third line III and the fourth line IV, the manipulation is made possible by depressing of a brake pedal.

When the brake pedal is depressed, the actuator 21 is made ON to attract and move the plunger 21a as shown in FIG. 1 to move the connecting member 22 in the direction indicated by the arrow J. The connecting member 22 connects an upper end thereof to the plunger 21a and fits a lower end thereof into a connection hole 23c formed on one end of the lock bar 23. The lock bar 23 is turned in the direction of the arrow L due to movement of the connecting member 22 in the direction of the arrow J. Thereby, the lock bar 23 turns about a shaft portion 23a, and the stopper 23b at the other end of the bar turns in the direction of the arrow L to get off a rear area of the lock pin 17 in a downward direction, so that the lock pin 17 can be made to enter into and move in the lock-pin insertion hole 4j shown in FIG. 5. Thereby, it becomes possible to manipulate the holder 3 and the shift lever 1.

Also, a buzzer 26 is arranged on a side wall of the casing 4 toward the P range as shown in FIGS. 1 and 3. The buzzer 26 operates together with an alarm lamp 43 to emit an alarm when the shift lever 1 is wrongly manipulated onto other range position in a state, in which an ignition switch (not shown) is made OFF to stop an engine. The buzzer 26 connects its lead line 26a to the second substrate 34.

Figure 7:
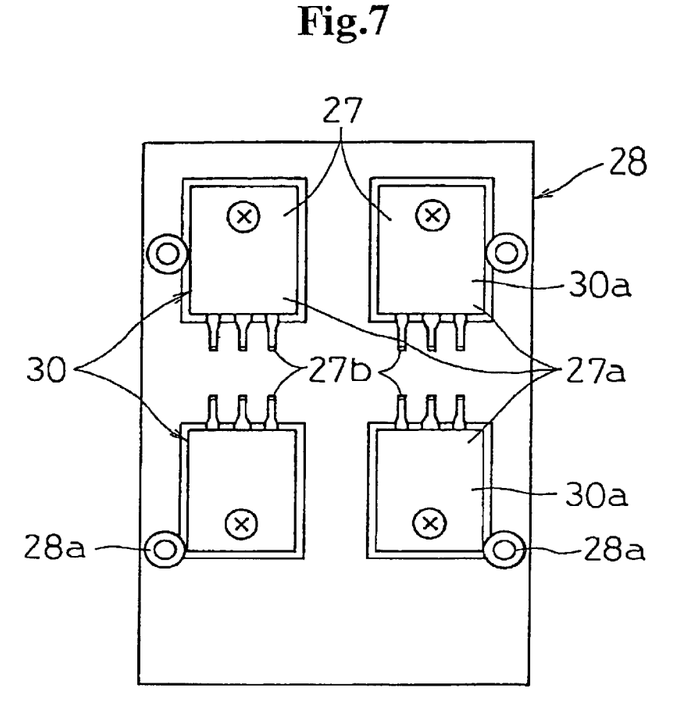
FIG. 7 is a view showing the embodiment of the invention, and an enlarged, front view showing a heat sink.
Figure 8:
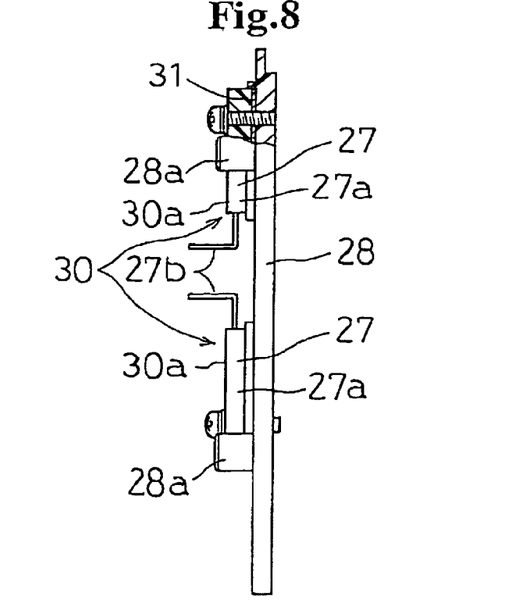
FIG. 8 is a view showing the embodiment of the invention, and an enlarged, side view showing the heat sink with a part thereof in cross section.

Also, arranged on a side wall of the casing 4 toward the D range are actuator control circuit devices 30, which are divided into actuator drive circuit units 30a and a main control circuit unit 30b as shown in FIG. 4. The actuator control circuit device 30 comprises a heat sink 28, to which electric parts 27 such as a plurality of POWER MOS FETs 27a or the like shown in FIGS. 7 and 8 are screwed, and an electrode board 29, to which the heat sink 28 is secured.

The heat sink 28 arranges thereon the electric parts 27 such as the POWER MOS FETs 27a or the like, which constitute the actuator drive circuit units 30a and generate heat, so that heat generated from the electric parts 27 is made easy to disperse. Heat resistance can be ensured for the actuator control circuit device 30 by providing the actuator drive circuit units 30a, which generate heat, on the heat sink 28, and dividing the heat sink 28, on which the main control circuit unit 30b is provided, into sections. The POWER MOS FETs 27a are fixed to the heat sink 28 of aluminum or the like through heat resistant sheets 31. Lead terminals 27b of the POWER MOS FETs 27a are soldered to terminals 32 insert molded on the electrode board 29 as shown in FIG. 10.

Figure 9:
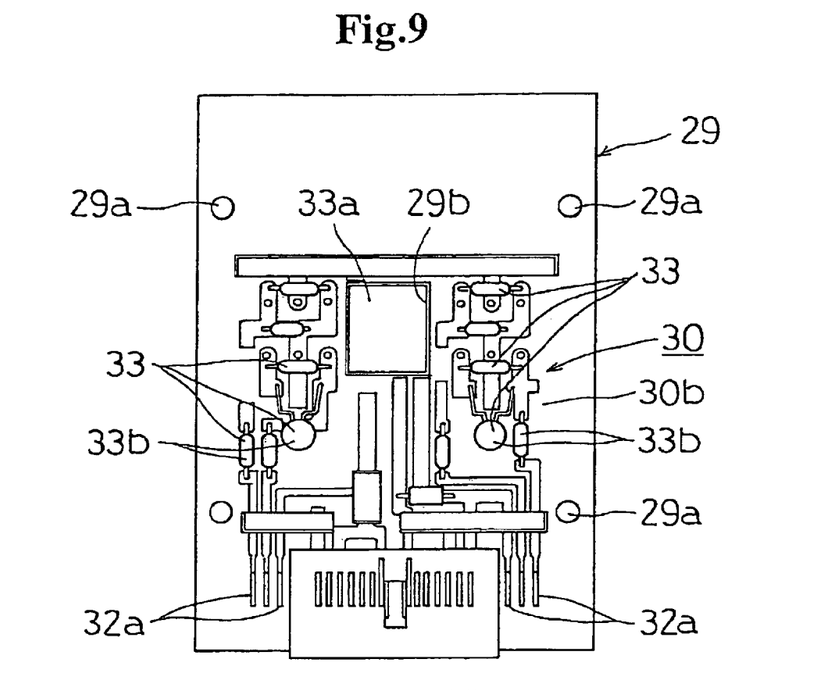
FIG. 9 is a view showing the embodiment of the invention, and an enlarged, front view showing an electrode board.
Figure 10:
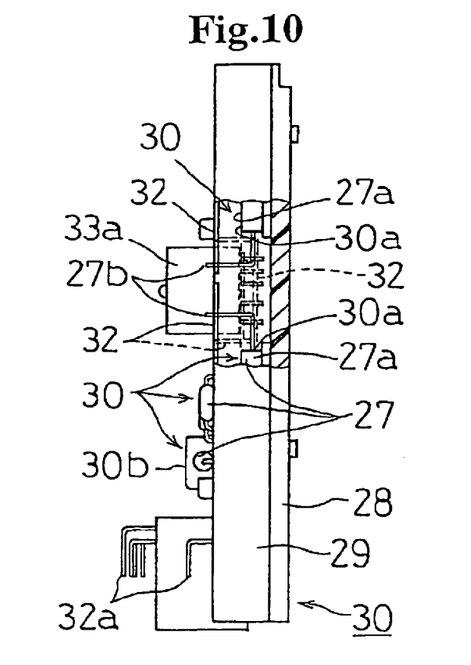
FIG. 10 is a view showing the embodiment of the invention, and an enlarged, side view showing the electrode board with a part thereof in cross section.

Soldered to the electrode board 29 as shown in FIGS. 9 and 10 are a relay 33a, which constitutes the main control circuit unit 30b, and electric parts 33 consisting of electric elements 33b such as resistors, condensers or the like, which generate relatively less heat, these elements being made integral to match the heat sink 28. The actuator control circuit device 30 is made small in thickness by arranging the relay 33a in a relay installation hole 29b formed in the electrode board 29 as shown in FIG. 4 in a manner to embed a half of the relay in the hole, and soldering the relay to the terminal 32 exposed in the relay installation hole 29b below the electrode board 29.

The actuator control circuit device 30 is fixed to the casing 4 by inserting screws into struts 28a of the heat sink 28 from an outer wall of the casing and threading the same into through holes 29a of the electrode board 29. A part of terminals 32a of the terminal 32 on the electrode board 29 is soldered to the second substrate 34 composed of a printed board screwed to a portion below the bottom plate portion 4i of the casing 4 as shown in FIGS. 3 and 4, and another part of the terminals is arranged on a connector section 29c. A lower cover 35 is arranged on a lower end of the casing 4 below the second substrate 34.

The upper cover 6 comprises a first rating plate 36 bearing thereon the respective P, R, N and D ranges, a second rating plate 37 bearing thereon the shift-up position + and the shift-down position −, and a third rating plate 38 bearing thereon a note of the shift-change manipulation. The first, second and third rating plates 36, 37 and 38 are formed of transparent members, and indicator lamps 39, 40 and 41 are arranged in areas below the respective first, second and third rating plates 36, 37 and 38., Arranged centrally in the area below the first rating plate 36 as shown in FIGS. 1, 2 and 5 is the night lighting lamp 39, which is put on together with ON of a lighting switch (not shown) to illuminate the first rating plate 36. Also, four indicator lamps 40 are provided on a lamp installation substrate 44 to be arranged, as shown in FIGS. 1 and 5, in an area below respective characters representative of the respective P, R, N and D ranges born on the first rating plate 36 to correspond to the number of positions of the shift lever 1. Only a predetermined lamp 40 is put on to illuminate a character of that range, in which the shift lever 1 is present, on the first rating plate 36.

Arranged in the area below the second rating plate 37 as shown in FIGS. 2 and 5 is the night lighting lamp 41, which is put on together with ON of a lighting switch to illuminate marks of the shift-up position + and the shift-down position − in the manual mode.

Arranged in the area below the third rating plate 38 is the alarm lamp 43 shown in FIG. 3, which is put on together with ON of the buzzer 26 to illuminate an alarm character on the third rating plate 38 when the shift lever 1 is manipulated onto other range in a state, in which an ignition switch (not shown) is made OFF to stop an engine and an automatic transmission device.

The path 6a on the upper cover 6 is defined by forming the first line I, second line II, third line III and the fourth line IV contiguous to the P range, R range, N range, D range, and positions composed of the shift-up position + and the shift-down position − as shown in FIG. 2.

The path 6a is composed of a first path 6b consisting of the P range formed in a right and left direction from the second line II to the fourth line IV, a second path 6c extending rearwardly of a vehicle from the fourth line IV of the first path 6b and having the R range, a third path 6d formed to extend from the fourth line IV in the R range of the second path 6c to the third line III in a rightward direction, a fourth path 6e formed to extend rearwardly of a vehicle from the third line III of the third path 6d to the N range, a fifth path 6f formed to extend from the third line III in the N range of the fourth path 6e to the second line II in a rightward direction, a sixth path 6g formed to extend rearwardly of a vehicle from the second line II in the N range of the fifth path 6f to the D range, a seventh path 6h formed to extend from the auto-mode of the second line II in the D range of the sixth path 6g to the manual mode of the first line I in a rightward direction, and an eighth path 6i formed to extend from the first line I of the seventh path 6h to the shift-up position + forwardly of a vehicle and the shift-down position − rearwardly of a vehicle.

The relationship between the magnetism sensing elements 12a, 12b, 12c, 19a, 19b, 19c composed of hall elements or the like in a select position switch S1 and the magnets 11, 20 and the parking gate switch S2 will be described below in detail on the basis of FIGS. 2, 3, 4, 5 and 6.

Figure 6:
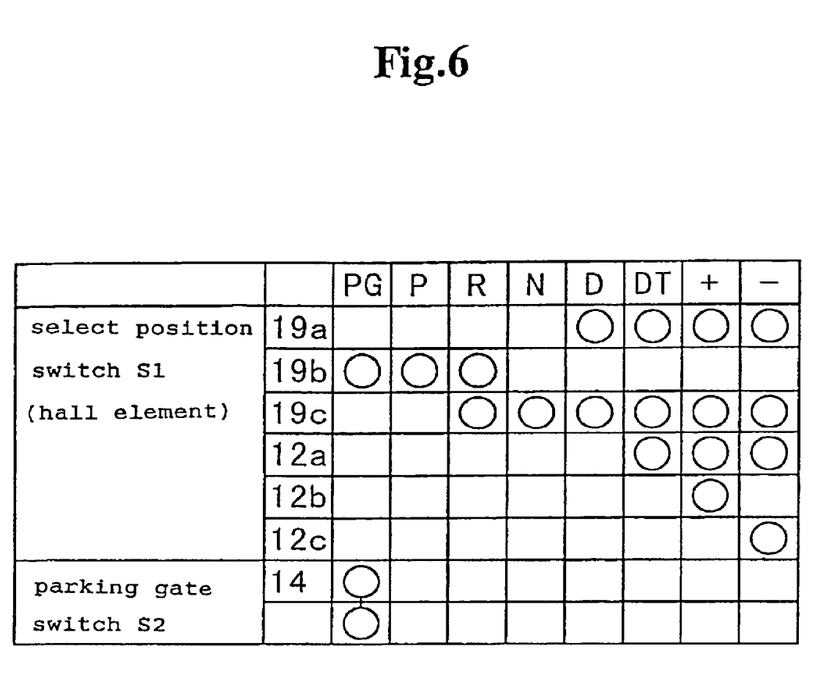
FIG. 6 is a view showing the embodiment of the invention, and a view showing a state, in which a select switch and a parking gate switch are opened and closed.

When the shift lever 1 is present in a position at PG of the P range shown in FIG. 6, the shift lever 1 is in a state, in which the perturbing body 10 engages with the first perturbation groove 4b shown in FIG. 3 to be present on the first path 6b and the perturbing body 10 is positioned centrally of the perturbation groove 4a shown in FIG. 5, the shift lever 1 being positioned in the second line II of the first path 6b.

When the shift lever 1 is present in the second line II of the P range, the select position switch S1 is put in such a position at PG in FIG. 6 that the magnetism sensing element 19b is made ON by means of the magnets 11, 20 and the parking gate switch S2 is also made ON. The parking gate switch S2 is made OFF as shown by P in FIG. 6 when the shift lever 1 is present on the third line III of the P range in the first path 6b.

When the shift lever 1 in the P range is to be manipulated onto the R range, the shift lever 1 present in the first path 6b is first manipulated leftward to the fourth line IV in the first path 6b and is operated rearward in the second path 6c to a position of the R range. The shift lever 1 is put in a state, in which the perturbing body 10 is moved to the second perturbation groove 4c shown in FIG. 3 to engage therewith for the shift lever to be present on the second path 6c of the fourth line IV. When the shift lever 1 is present on the fourth line IV, the perturbing body 10 is brought into pressure contact with the second inclined surface 4g as shown in FIG. 5.

When hand separates from the shift lever 1 in this position, the perturbing body 10 moves centrally of the perturbation groove 4a from the second inclined surface 4g shown in FIG. 5. Thereby, the shift lever 1 is brought into pressure contact with an edge of the third path 6d in the third line III of the third path 6d to be made stationary in a position in the R range. When the shift lever 1 is present in the R range, the magnetism sensing elements 19b, 19c of the select position switch S1 are made ON as at R shown in FIG. 6 by means of the magnet 20.

When the shift lever 1 in the R range is to be manipulated onto the N range, the shift lever 1 present on the third line III of the third path 6d is manipulated rearward onto the N range of the fourth path 6e. The shift lever 1 is put in a state, in which the perturbing body 10 is moved to the third perturbation groove 4d shown in FIG. 3 to engage therewith and the shift lever is moved to the fifth path 6f in the second line II along the second inclined surface 4g of the perturbation groove 4a shown in FIG. 5 when hand separates from the shift lever. When the shift lever 1 is present on the second line II, the perturbing body 10 is brought into pressure contact with a center of the perturbation groove 4a to be kept in that condition. And when the shift lever 1 is present in the N range, the magnetism sensing element 19c of the select position switch S1 is made ON as at N shown in FIG. 6 by the magnet 20.

And when the shift lever 1 present in the N range is to be manipulated to the D range, the shift lever 1 present on the second line II of the fifth path 6f is manipulated rearward to the D range of the sixth path 6g. The shift lever 1 is put in a state, in which the perturbing body 10 is moved to the fourth perturbation groove 4e shown in FIG. 3 to engage therewith, and is kept centrally of the perturbation groove 4a shown in FIG. 5 when hand separates from the shift lever. When the shift lever 1 is present in the auto-mode of the D range, the magnetism sensing elements 19a, 19c of the select position switch S1 are made ON as at D shown in FIG. 6 by the magnet 20.

When the shift lever 1 in the auto-mode of the D range is to be manipulated onto the manual mode, the shift lever 1 present in the second line II of the seventh path 6h is manipulated rightward to the first line I in the auto-mode of the seventh path 6h. The shift lever 1 is put in a state, in which the perturbing body 10 continues to be engaged while remaining in the fourth perturbation groove 4e shown in FIG. 3 and the perturbing body 10 comes into pressure contact with the first inclined surface 4f of the perturbation groove 4a as shown in FIG. 5.

And when the shift lever 1 is present in the manual mode of the D range, the magnetism sensing elements 12a, 19a, 19c of the select position switch S1 are made ON as at DT shown in FIG. 6 by the magnets 11, 20.

When the shift lever 1 present in the manual mode is to be manipulated onto the shift-up position +, the shift lever 1 present on the first line I of the eighth path 6i is manipulated forward to the shift-up position + in the eighth path 6i. The shift lever 1 is put in a state, in which the perturbing body 10 gets over the inclined surface of the fourth perturbation groove 4e shown in FIG. 3 and the perturbing body 10 continues to come into pressure contact with the first inclined surface 4f of the perturbation groove 4a as shown in FIG. 5.

And when the shift lever 1 is present in the shift-up position + in the manual mode, the magnetism sensing elements 12a, 12b, 19a, 19c of the select position switch S1 are made ON as at + shown in FIG. 6 by the magnets 11, 20.

And when hand separates from the shift lever 1, the shift lever 1 is put in a state, in which the perturbing body 10 descends from the inclined surface of the fourth perturbation groove 4e shown in FIG. 3 to be moved to a center of the fourth perturbation groove 4e to be automatically returned to a center of the eighth path 6i.

When the shift lever 1 is to be manipulated onto the shift-down position −, the shift lever 1 present in a center of the eighth path 6i is manipulated rearward to the shift-down position − in the eighth path 6i. The shift lever 1 is put in a state, in which the perturbing body 10 gets over the inclined surface of the fourth perturbation groove 4e shown in FIG.

3 and the perturbing body 10 continues to be in pressure contact with the first inclined surface 4f of the perturbation groove 4a as shown in FIG. 5.

And when the shift lever 1 is in the shift-down position − in the manual mode, the magnetism sensing elements 12a, 12c, 19a, 19c of the select position switch S1 are made ON by the magnets 11, 20 as at − shown in FIG. 6.

And when hand separates from the shift lever 1, the shift lever 1 is put in a state, in which the perturbing body 10 descends from the inclined surface of the fourth perturbation groove 4e shown in FIG. 3 to be moved to the center of the fourth perturbation groove 4e to be automatically returned to the center of the eighth path 6i.

And when the shift lever 1 is manipulated onto the respective manipulating positions, the select position switch S1 is actuated with the swinging manipulation of the shift lever 1, and an electric signal corresponding to a desired manipulating position is transmitted to a transmission side, so that electric control making use of such electric signal causes manipulation of automatic transmission for an engine.

Figure 11:
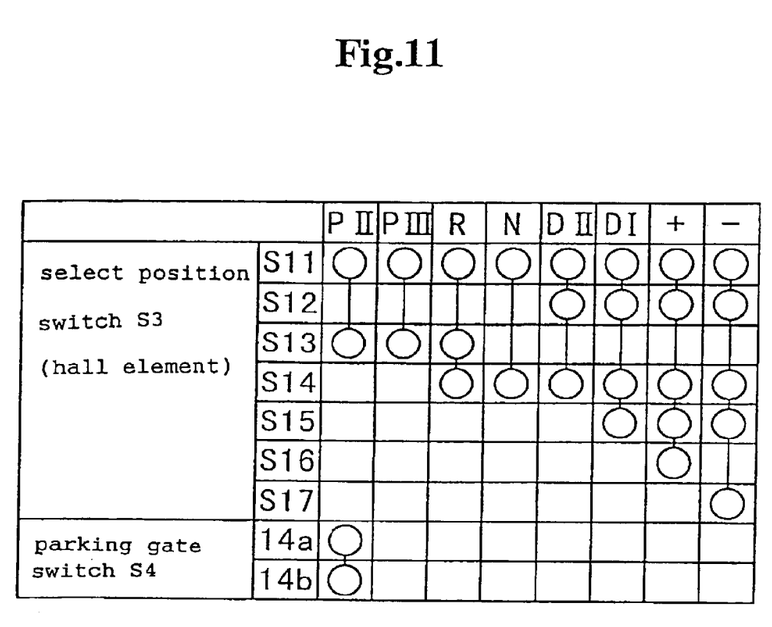
FIG. 11 is a view showing another embodiment of the invention, and a view showing a state, in which a select switch and a parking gate switch are opened and closed.

In addition, the select: position switch S1 may be a switch means provided with a switch contact mechanism shown in FIG. 11, as well as the measure comprising the magnets 11, 20 and the magnetism sensing elements 12, 19. The switch means can be realized, for example, by forming on the holder 3 an manipulating unit, which replaces the magnet 11, providing on the first substrate 13 three micro switches, which replace the magnetism sensing elements 12a, 12b, 12c, arranging on the rotor 18 a movable contact, which replace the magnet 20, and providing on the first substrate 13 three stationary contacts, which replace the magnetism sensing elements 19a, 19b, 19c.

Also, slide contact pieces may be mounted on the holder 3 and the rotor 18, and respective stationary contacts may be mounted on the first substrate 13 to correspond to the respective magnetism sensing elements 12a, 12b, 12c, 19a, 19b, 19c. That is, when the shift lever 1 is on the second line II of the P range as shown in FIG. 11, movable contacts of the select position switch S3 come into contact with a stationary contact S11 and a stationary contact S13, and movable contacts of the parking gate switch S4 are designed to come into contact with a stationary contact 14a and a stationary contact 14b.

When the shift lever 1 is on the third line III of the P range, the movable contacts of the select position switch S3 come into contact with the stationary contact S11 and the stationary contact S13. When the shift lever 1 is in the R range, the movable contacts of the select position switch S3 are designed to come into contact with the stationary contact S11, the stationary contact S13 and the stationary contact S14.

When the shift lever 1 is on the N range, the movable contacts of the select position switch S3 are designed to come into contact with the stationary contact S11 and the stationary contact S14. When the shift lever 1 is on the second line II of the D range, the movable contacts of the select position switch S3 are designed to come into contact with the stationary contact S11, the stationary contact S12 and the stationary contact S14.

When the shift lever 1 is on the first line I of the D range, the movable contacts of the select position switch S3 are designed to come into contact with the stationary contact S11, the stationary contact S12, the stationary contact S14 and the stationary contact S15.

When the shift lever 1 is in the shift-up position +, the movable contacts of the select position switch S3 are designed to come into contact with the stationary contact S11, the stationary contact S12, the stationary contact S14, the stationary contact S15, and a stationary contact S16. When the shift lever 1 is in the shift-down position −, the movable contacts of the select position switch S3 are designed to come into contact with the stationary contact S11, the stationary contact S12, stationary contact S14, the stationary contact S15, and a stationary contact S17.

The invention provides a shift manipulating device for an automatic transmission, comprising a path which is formed on an upper cover of a control switch device and permits a shift lever of the automatic transmission to be inserted therethrough to thereby restrict a direction of manipulation of the shift lever, wherein the path comprises operating positions composed of at least a P range, R range, N range, and a D range, the P range, R range, N range and the D range being arranged in this order from a front side of a vehicle, the shift lever being adapted to be disposed on three lines including a second line, third line and a fourth line in a right and left direction; the P range is formed on an end of the path and arranged in a first path on the second line; the R range is arranged in a third path on the third line from the first path through a second path; the N range is arranged in a fifth path on the second line from the third path through a fourth path; and the D range is contiguous and adjacent to the fifth path and arranged in a sixth path on the second line. Thus in the case where the shift lever present in the P range is to be manipulated to other ranges, the shift lever must be manipulated nonlinearly in a substantially stepwise manner, and so malfunction of the shift lever can be prevented. Also, since the P range, N range and the D range are positioned on the same second line, a stopper can be provided laterally of the shift lever to prevent the shift lever from being manipulated onto other ranges from the P range except at a desired time and from malfunctioning from the N range and the D range to the R range and the P range.

According to the invention, the shift lever has a knob at an upper end thereof and a holder at a lower end thereof provided with a perturbing body, which is biased by a perturbation spring, and the holer supports a second shaft in a rotatable manner and is provided with a first shaft, which is perpendicular to the second shaft and is born by a casing. Thus the first shaft and the second shaft can serve as universal joints to support the shift lever in a swingable and operable manner in a front and rear direction and a right and left direction.

According to the invention, the perturbing body is in pressure contact with a perturbation groove for returning the shift lever to the second line of the path, and a perturbation groove for supporting the shift lever in the P range, R range, N range and the D range. Thus the shift lever in the respective paths can be biased toward the second line to be held in a position in the predetermined range.

According to the invention, the holder mounts a lock pin laterally thereof for preventing the shift lever on the second line from moving toward the third line. Thus it is possible to prevent the shift lever from being manipulated onto other positions than a position on a predetermined line and from malfunctioning to other positions than a predetermined position.

According to the invention, the lock pin is biased by a spring and arranged in a lock-pin insertion hole in a manner to be capable of incoming and outgoing, the lock-pin insertion hole being formed in an inner wall of the casing, and a stopper movably arranged on a back portion of the lock pin prevents the lock pin from entering into the lock-pin insertion hole. Thus the stopper prevents movements of the lock pin, which abuts against the holder, so that it is possible to prevent the shift lever from being swingingly manipulated in other directions than a predetermined direction at a particular point of time and from malfunctioning to other positions than a predetermined position.

According to the invention, the stopper is swung by an actuator via a linkage, and the linkage connects at one end thereof to the actuator and has at the other end thereof the stopper, which is arranged on the back portion of the lock pin to be capable of incoming and outgoing. Thus an electric signal from the control switch device can be used to readily actuate the actuator to prevent movements of the shift lever.

According to the invention, the first shaft has a rotor adapted for rotation together with the first shaft and provided with a magnet, and a first substrate is provided near the rotor to mount thereon magnetism sensing elements, which are responsive to magnetism of the magnet. Thus the magnet and the magnetism sensing elements can be used to detect in which range the shift lever is present. Also, since the magnet and the magnetism sensing elements can be arranged in a non-contact condition with a space therebetween, it is possible to prevent deterioration due to wear. Also, according to the invention there is provided a switching section composed of the magnet and the magnetism sensing elements to eliminate contact as in movable and stationary contacts, so that there is caused no frictional resistance due to contact therebetween, which improves a feeling in manipulation of the shift lever and can prevent contact failuer due to generation of abrasion particles due to friction.

According to the invention, the holder is provided at a side thereof with a magnet, and a first substrate is provided near the holder to mount thereon magnetism sensing elements, which are responsive to magnetism of the magnet. Thus a multiplicity of magnetism sensing elements can be arranged on a single first substrate and so a multiplicity of switching elements (magnetism sensing elements) for detecting a position of the shift lever can be arranged in a narrow space, so that it is possible to achieve saving in space and make a shift manipulating device for an automatic transmission small in size.

According to the invention, the holder is provided on a side thereof with a pushing portion for opening and closing a parking gate switch, and a first substrate is provided near the holder to mount thereon the parking gate switch. Thus the switch adapted to be actuated when the shift lever is manipulated in a right and left direction while being in a desired position is mounted on the first substrate, and so it is possible to detect the position of the shift lever in a state, in which it is in no contact with the holder or the like, thereby enabling contact failuer due to wear of contacts or the like.

The invention also for an automatic transmission, provides a shift manipulating device comprising a path which is formed on an upper cover of a control switch device and permits a shift lever of an automatic transmission to be inserted therethrough to thereby restrict a direction of manipulation-of the shift lever, wherein the shift lever has a lower end thereof disposed within a casing, which is mounted on the upper cover, and an electrode board is provided in the casing to mount thereon electric parts of an actuator control circuit device for actuating an actuator for preventing movements of the shift lever. Thus those electric parts which compose the actuator control circuit device, can be arranged in suitable positions on the casing to make the entire device compact, and to dispense with electric wiring work.

According to the invention, the electric parts generating heat among the electric parts of the actuator control circuit device are mounted on a heat sink, which in turn is mounted on the electrode board. Thus it is possible to eliminate those influences on electric parts, which are caused by heat generated from other electric parts, and to improve heat resistance and current resistance of the entire actuator control circuit device. Also, electric parts are arranged on the electrode board in such a manner that they are allotted to the heat sink, which is separate from the electrode board and disperses heat, and the heat sink is correspondingly assembled to the electrode board in a three-dimensional manner, whereby the entire device can be disposed within a small space.

according to the invention, the casing mounts in a lower area therein a bottom plate portion formed with a perturbation groove, with which a perturbation body provided on a holder at a lower end of the shift lever comes into pressure contact, and mounts on an inner wall thereof the electrode board, and a second substrate is arranged below the bottom plate portion to connect thereto terminals mounted on the electrode board. Thus the substrates can be arranged separately in two locations, and the casing receiving therein the substrates can be made small-sized to make the entire shift manipulating device small-sized.

The invention also provides a shift manipulating device for an automatic transmission, comprising a path which is formed on an upper cover of a control switch device and permits a shift lever of the automatic transmission to be inserted therethrough to thereby restrict a direction of manipulation of the shift lever, wherein the shift lever has a lower end thereof disposed within a casing which is mounted on the upper cover, and a buzzer is arranged in the casing. Thus when the shift lever is swimming and manipulated in a direction other than a predetermined direction, for example, when the shift lever is wrongly manipulated onto other range positions, for example, in a state, in which an ignition switch is made OFF to stop an engine and an automatic transmission, an alarm can be raised by emitting an alarm sound. Thereby it is possible to make the range condition of a transmission in accord with the range condition of the shift manipulating device.

What is claimed is:

1. A shift manipulating device for an automatic transmission, comprising a path, which is formed on an upper cover of a control switch device and permits a shift lever of the automatic transmission to be inserted therethrough to thereby restrict a direction of manipulation of the shift lever, wherein the path comprises a first path, a second path, a third path, a fourth path, a fifth path, a sixth path, and operating positions composed of at least a P range, R range, N range, and a D range, the P range, R range, N range, and the D range being arranged in this order from a front side of a vehicle, the shift lever being adapted to be disposed on lines including a first line, second line, a third line and a fourth line in a right and left direction;

the P range is formed on an end of the path and arranged in the first path on the second line;

the R range is arranged in the third path on the third line from the first path through the second path;

the N range is arranged in the fifth path on the second line from the third path through the fourth path; and the D range is contiguous and adjacent to the fifth path and arranged in the sixth path on the second line, wherein the shift lever has a knob at an upper end thereof and a holder at a lower end thereof provided with a perturbing body, which is biased by a perturbation spring, and the holder is provided with a first shaft and supports a second shaft in a rotatable manner, the first shaft is perpendicular to the second shaft and is born by a casing, wherein the perturbing body is in pressure contact with a perturbation groove for returning the shift lever to the second line of the path, and another perturbation groove for supporting the shift lever in the P range, R range, N range and the D range, wherein the holder mounts a lock pin laterally thereof for preventing the shift lever on the second line from moving toward the third line, wherein the lock pin is biased by a spring and arranged in a lock-pin insertion hole in a manner to be capable of incoming and outgoing, the lock-pin insertion hole being formed in an inner wall of the casing, and a stopper movably arranged on a back portion of the lock pin prevents the lock pin from entering into the lock-pin insertion hole, and wherein the stopper is swung by an actuator via a linkage, and the linkage connects at one end thereof to the actuator and has at the other end thereof the stopper, which is arranged on the back portion of the lock pin to be capable of incoming and outgoing.

2. The shift manipulating device according to claim 1, wherein the first shaft has a rotor adapted for rotation together with the first shaft and provided with a rotor magnet, and a first substrate is provided near the rotor to mount thereon rotor magnetism sensing elements, which are responsive to magnetism of the rotor magnet.

3. The shift manipulating device according to claim 2, wherein the holder is provided at a side thereof with a holder magnet, and the first substrate is provided near the holder to mount thereon holder magnetism sensing elements, which are responsive to magnetism of the holder magnet.

4. The shift manipulating device, according to claim 3, wherein the holder is provided on a side thereof with a pushing portion for opening and closing a parking gate switch, and the first substrate is provided near the holder to mount thereon the parking gate switch.

5. The shift manipulating device according to claim 2, wherein the holder is provided on a side thereof with a pushing portion for opening and closing a parking gate switch, and the first substrate is provided near the holder to mount thereon the parking gate switch.

6. The shift manipulating device according to claim 1, wherein the holder is provided at a side thereof with a magnet, and a first substrate is provided near the holder to mount thereon magnetism sensing elements, which are responsive to magnetism of the magnet.

* * * * *